United States Patent [19]

Hinterreiter et al.

[11] Patent Number: 4,466,758
[45] Date of Patent: Aug. 21, 1984

[54] HOLDING BODY TO ATTACH A SEALING FOIL OF SYNTHETIC MATERIAL TO A FOUNDATION

[76] Inventors: Ignaz Hinterreiter, Ramsauerstrasse 119, Linz, Austria, A-4020; Walter Neumüller, Argentinierstrasse 26, Vienna, Austria, A-1040

[21] Appl. No.: 343,337

[22] Filed: Jan. 27, 1982

[30] Foreign Application Priority Data

Feb. 11, 1981 [AT] Austria .................................. 638/81

[51] Int. Cl.³ ...................... E21D 11/38; E21D 11/40
[52] U.S. Cl. .................................. 405/150; 405/132; 52/410; 52/698; 248/548; 403/2; 403/270
[58] Field of Search ...................... 405/150, 151, 146; 24/201 C, 201 R, 204, 115 F

[56] References Cited

U.S. PATENT DOCUMENTS

| | | | |
|---|---|---|---|
| 3,172,443 | 3/1965 | Ausnit | 24/201 C |
| 3,345,709 | 10/1967 | Bearman | 24/201 C |
| 3,853,226 | 12/1974 | Hine et al. | 24/204 X |

FOREIGN PATENT DOCUMENTS 2532664  1/1977  Fed. Rep. of Germany ...... 405/150

Primary Examiner—Dennis L. Taylor
Attorney, Agent, or Firm—Kurt Kelman

[57] ABSTRACT

Holding body for attaching a sealing foil of synthetic material to a foundation, in particular a tunnel wall, consisting of two discs connected to each other and parallel to each other, of which one with its base surface contacts on the foundation, and the other is connected to the synthetic foil, the discs (2,3) being connected integrally to each other by means of at least one bar (4), and the bar (4) having a tearing point of predetermined tearing strength.

5 Claims, 5 Drawing Figures

HOLDING BODY TO ATTACH A SEALING FOIL OF SYNTHETIC MATERIAL TO A FOUNDATION

The invention concerns a holding body to attach a sealing foil of synthetic material to a foundation in particular a tunnel wall, consisting of two discs connected with each other and substantially parallel to each other, of which one with its base surface lies on the foundation, and the other is connected to the synthetic foil by means of a top surface.

In a holding body such as that known from the Austrian Pat. No. 337 762 for attaching a synthetic foil, metal plates with a layer of synthetic material are attached to the foundation, and the synthetic foil laid over it is welded with the metal plate. The metal plates have the disadvantage that they are complicated to produce. Furthermore, an even welding between the metal plates with a layer of synthetic material and the foil is difficult to achieve even with the use of complicated high-frequency welding apparatus.

Swiss Pat. No. 591 010 shows a holding body made of synthetic material. After attaching such holding bodies to the foundation, the synthetic foil is laid over them and welded to them, whereby the use of weld-impeding additives achieves a strength of the welding between the holding body and the synthetic foil which is less than the tearing strength of the synthetic foil. The aim of this known holding body is that the synthetic foil detaches itself from the holding body when the foil is pressed into irregularities in the foundation and tensile stresses exceeding the tearing strength of the foil affect the same. This known holding body, especially used in tunnel insulation, has however the disadvantage that it is in practice difficult to achieve the desired degree of welding between the foil and the holding body. The stability of the welding is either too low, so that the foil detaches itself from the holding body even if the least tensile load, is applied or the stability of the welding is, although less than that of the tearing strength of the foil, already so great that in detaching the foil from the holding body and when tensions greater than the tearing strength of the foil occur, tears and holes occur, which lead to loss of seal in the foil in the vicinity of the weld between the holding body and the foil.

Further, a holding body of magnetized metal is known (Swiss Pat. No. 593 416). This holding body has a heat adhesive layer, whereby the foil is first held with permanent magnetic plates and then is finally adhered to the holding body by the application of heat. This holding body has not proved successful in practice, as the permanent magnetic plates do not guarantee a reliable holding of the foil.

The aim of the invention is to remedy the above disadvantages of the known holding bodies. This is achieved, according to the invention, by connecting both discs by means of a bar having a tearing point of predetermined tearing strength.

In the holding body according to the invention, the tearing point for securing the foil is placed within the holding body. In this way, it is no longer necessary to carry out a difficult welding with weld-impeding additives. The foil can be fully welded onto the covering surface, so that the foil can be additionally strengthened in this critical area. The holding body is easy to produce, for example by injection moulding, so that there is no difficulty in providing for a dividing surface with exactly defined tearing strength.

The invention is more fully described with reference to the drawing wherein.

Figure 1:
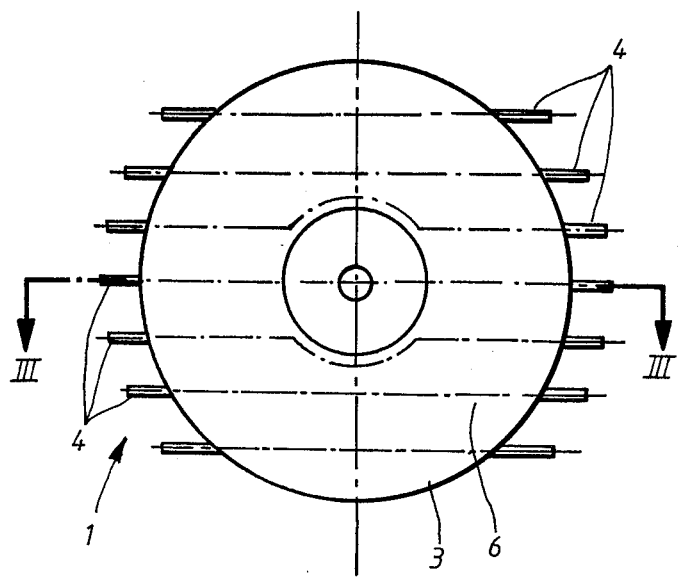
FIG. 1 shows a top view of a holding body according to the invention.
Figure 2:
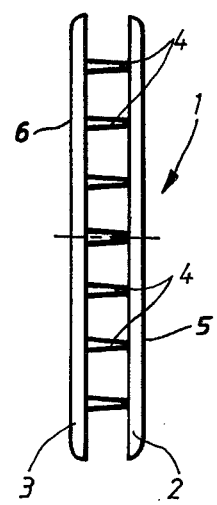
FIG. 2 shows a side view of the holding body according to FIG. 1.
Figure 3:
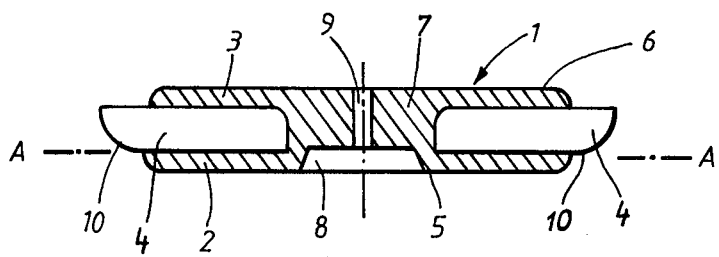
FIG. 3 shows a cross-section of the holding body along the line III—III in FIG. 1.

Holding body 1, consists of two circular discs 2 and 3, which are connected with each other by bars 4 running parallel to each other. As clearly shown in FIG. 3, the discs and bars form an integral body. Disc 2 has a top surface 5, and disc 3 has a base surface 6. The cross-section of bar 4 decreases in the direction towards top surface 5. The central part of the holding body has a through core 7 which has a cylindrical countersunk recess 8 top surface 5. The core 7 has a through hole 9. Bars 4 project beyond the discs 2 and 3, edge 10 of the projecting bars pointing towards the top surface 5 being rounded.

Figure 4:
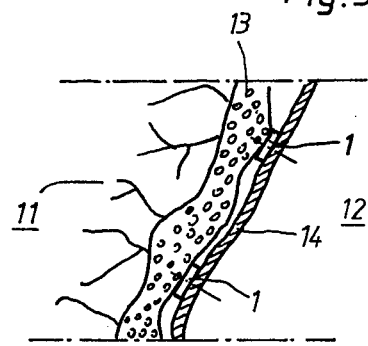
FIG. 4 and FIG. 5 show sections of a tunnel wall in cross-section in explanation of the procedure according to the invention.
Figure 5:
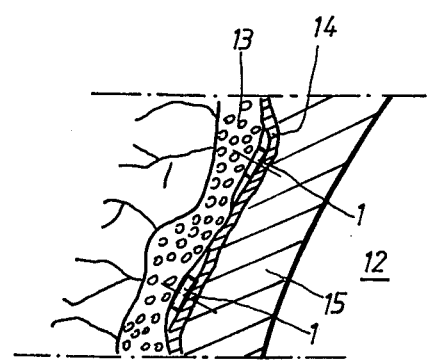

The attachment of a foil to a tunnel wall with the help of a holding body according to the invention is described more fully hereinafter with reference to FIGS. 4 and 5 showing a tunnel insulation.

First of all, a layer of sprayed cement 13 is applied to the rock surface 11, facing the tunnel. Then, the holding bodies 1 are attached to the layer of sprayed cement 13 by means of nails projecting through the hole 9 (the nails are not shown). In this manner, the base surface 6 is placed against the layer of sprayed cement. The nail heads are sunk into recess 8 of the holding body 1. Then, a synthetic foil 14 is laid over the holding bodies 1, such foil usually consisting of several widths of foil welded together. Then, the synthetic foil 14 is welded or stuck to the top surfaces 5 of the disc 2 of the holding body.

Cement 15 is now sprayed by gun under pressure over the synthetic foil 14 which is connected to the holding bodies 1. In this way, the synthetic foil 14 is pressed against the layer of sprayed cement 13, as can be seen from FIG. 5. Thereby, the synthetic foil 14 is stretched to a relatively great extent. If undesired high tensions now occur, which could lead to a tearing of the synthetic foil 14 or a detaching of the synthetic foil 14 from the top layer 5 of the holding body 1, disc 2 connected to the synthetic foil begins to detach itself from the bars 4, i.e. the bars 4 tear at the point of their least cross-section. According to the direction and strength of the tensions occuring, disc 2 tears partially or completely from bars 4 along the tearing line A—A (FIG. 3), disc 2 remaining firmly connected to the synthetic foil 14, and the parts of the foil in the vicinity of disc 2 slipping onto the rounded edges 10 of the bars 4, which then are pushed over sideways.

It is essential for the procedure according to the invention, in contrast to the state of the art, that an especially good, close connection between the synthetic foil 14 and the top surface 5 of the disc is provided for, so that in no case the tension would lead to a detachment of the foil 14 from the top surface of the disc 2. The holding body 4 should tear along the planned tearing points before a detachment of the connection between the foil 14 and the top surface 5 of the disc 2 occurs.

Polyvinylchloride, polyethylene or polypropylene are preferable for the synthetic foil 14, of a thickness of 1–5, preferably 1.5–3 mm, and a tearing strength of between 100–200 Kp/cm$^2$, preferably 150–170 Kp/cm$^2$. The holding bodies consist preferably of the same material as the synthetic foil 14. The holding body is preferably injection moulded in one piece and the tearing strength of the connection between the line A—A (FIG. 3) should normally be 10, preferably 20–30 Kp/cm$^2$ below that of the synthetic foil.

As already stated above, a good connection between the synthetic foil 14 and the top surface 5 of disc 2 of the holding body is essential for the procedure according to the invention. This is preferably achieved by means of a welded connection and normally thermal welding procedures can be used. However, adhesion using normal synthetic adhesives has also proved successful. In order to achieve a good weld or adhesive connection between the foil 14 and the holding body, it is preferable that the upper surface of the top layer 5 shall be as smooth as possible. The tearing strength of the synthetic foil should be at least the same as the detachability of the foil from the holding body 1, and is preferably 1:1.2–1:1.5.

Instead of parallel bars 4, bars arranged in a star shape or arranged in coaxial circles to each other could be used.

What is claimed is:

1. A holding body for attaching a sealing foil of synthetic material to a foundation, which comprises two discs extending substantially parallel to each other and at least one bar substantially parallel to the discs and interposed therebetween, the two discs and the bar forming a one-piece body, one of the discs having a base surface for contact with the foundation and the other disc having a top surface for connection to the sealing foil, and the bar having a tearing point of predetermined tearing strength.

2. The holding body of claim 1, wherein the cross section of the bar is reduced in the direction of the top surface whereby the tearing point is formed in the vicinity of the top surface.

3. The holding body of claim 1, comprising a plurality of said bars, the bars being straight and substantially parallel to each other.

4. The holding body of claim 3, wherein the bars have parts projecting beyond the periphery of the surfaces, the projecting bar parts facing the top surface being rounded.

5. The holding bar of claim 1, wherein the other disc defines a coaxial countersunk recess and the body defines a coaxial through hole extending from the recess to the base surface.

* * * * *